United States Patent [19]

Kennedy, Jr.

[11] Patent Number: 4,629,570

[45] Date of Patent: Dec. 16, 1986

[54] REMOVAL OF IRON FROM CHELANT SOLUTIONS

[75] Inventor: Weldon C. Kennedy, Jr., Tulsa, Okla.

[73] Assignee: Dowell Schlumberger Incorporated, Tulsa, Okla.

[21] Appl. No.: 756,914

[22] Filed: Jul. 18, 1985

Related U.S. Application Data

[63] Continuation of Ser. No. 319,518, Nov. 9, 1981, abandoned.

[51] Int. Cl.$^4$ .............................................. C02F 1/54
[52] U.S. Cl. ..................................... 210/666; 210/694; 210/725; 210/727; 210/912; 423/34; 423/140
[58] Field of Search ................ 75/108; 204/48, 52 R, 204/DIG. 13; 210/666, 667, 688, 694, 705, 721, 723, 724, 725, 727, 729, 734, 912; 423/140, 34; 562/566

[56] References Cited

U.S. PATENT DOCUMENTS

| | | | |
|---|---|---|---|
| 3,171,800 | 3/1965 | Rice et al. | 210/722 |
| 3,308,065 | 3/1967 | Lesinski | 252/82 |
| 3,413,160 | 11/1968 | Teumac | 148/6.14 R |
| 3,438,811 | 4/1969 | Harriman et al. | 134/2 |
| 4,025,430 | 5/1977 | Pagel | 210/727 |
| 4,053,400 | 10/1977 | Merker et al. | 204/49 |
| 4,172,784 | 10/1979 | Knorre et al. | 210/722 |
| 4,172,785 | 10/1979 | Knorre et al. | 423/43 |
| 4,332,687 | 6/1982 | Daignault et al. | 210/721 |
| 4,394,355 | 7/1983 | Fruge | 562/566 |
| 4,419,246 | 12/1983 | Jayawant | 210/912 |

FOREIGN PATENT DOCUMENTS 51-10176  1/1976  Japan ................................ 210/912

OTHER PUBLICATIONS

Weiner, *Plating*, 1359, 12/1967.
Hykan, *Power*, 78, 12/1978.
Brennan et al., *Power*, 80, 4/1979.

*Primary Examiner*—Peter Hruskoci
*Attorney, Agent, or Firm*—L. Wayne White

[57] ABSTRACT

A process is described for removing dissolved iron from an aqueous liquid containing iron in the form of a soluble complex with alkylenepolyamine polyacetic acids or salts thereof. The process comprises the steps of (a) adjusting the pH of said aqueous liquid to at least about 12.5, (b) adding sufficient quantities of a soluble calcium salt to facilitate the growth of insoluble iron hydroxide particles, and (c) separating the resulting insoluble mass containing iron hydroxide from the liquid effluent.

17 Claims, No Drawings

REMOVAL OF IRON FROM CHELANT SOLUTIONS

CROSS-REFERENCE TO RELATED APPLICATION

This is a continuation of application Ser. No. 319,518 filed Nov. 9, 1981, now abandoned.

BACKGROUND OF THE INVENTION

1. Field of the Invention

This invention pertains to the process for removing dissolved iron from an aqueous liquid containing iron chelated by an alkylenepolyamine polyacetic acid. More particularly, this invention pertains to a treatment process for removing dissolved iron from certain liquid waste.

2. Description of the Prior Art:

The alkylenepolyamine polyacetic acid chelants form a known class of compounds having many members. The most common of these are ethylenediaminetetraacetic acid (EDTA) and diethylenetriaminepentaacetic acid (DEPA); and of these, (EDTA) is by far the most widely used compound on a commercial scale. Because the materials are relatively insoluble in the acid form, such compounds are normally used as their soluble salts. The alkali metal (e.g. sodium) salts and the ammoniated salts are the best known.

There are many chelant uses for the alkylenepolyamine polyacetic acids, but one such utility is in cleaning iron oxide containing scale from steam generating equipment. In almost any type of metal equipment in which water is evaporated or heat transfer occurs, insoluble salts deposit upon the surface to form a scale. The composition of the scale will vary depending upon the water which has been used, the type of equipment, the operating temperature etc. The scale may be very dense or coarse, tightly bound to the base metal or not. In most steam generating units, the scale usually consists of oxides of iron, which include magnetite together with red iron oxide. And when the steam generating unit is fabricated using parts containing copper or copper alloys, as for example, in the condenser units, the scale will normally contain copper and/or copper oxide(s).

Several investigators have addressed the problem of scale removal. Lesinski described in U.S. Pat. No. 3,308,065 a unique way of removing iron oxide containing scale from ferrous metal surfaces and for passivating the clean surface. Lesinski discovered that ammoniated salts of alkylenepolyamine polycarboxylic acids were particularly efficient in scale removal when used at an alkaliine pH (generally above about a pH of 8). Ammoniated EDTA used at a pH of from about 8 to about 11, preferably about 9, was said to be a preferred solvent.

Harriman et al. in U.S. Pat. No. 3,438,811 discovered that an aqueous solution of a ferric chelate of an alkylenepolyamine polycarboxylic acid at an alkaline pH was unusually effective in removing copper-containing encrustations or elemental copper from ferrous metal surfaces.

Teumac (U.S. Pat. No. 3,413,160) then described a method of passivating ferrous metal surfaces which has been cleaned using an alkylenepolyamine polycarboxylic acid at an alkaline pH to remove iron-oxide containing scale and/or copper encrustations from steam generating equipment. in this process, an oxidizing agent was added at the end of the cleaning process and the oxidation potential of the aqueous solution was carefully monitored to achieve the desired degree of passivation.

The technology described by Lesinski, Harriman, and Teumac represent the state of the art. All use alkylenepolyamine polycarboxylic acids or salts thereof at an alkaline pH and all generate waste solutions which contain dissolved iron as an iron chelate with the alkylenepolyamine polycarboxylic acids. And, in most instances, the aqueous solutions also contain dissolved copper as a copper chelate.

Waste disposal is a significant problem in today's industrial environment. Thus, the problem of how to safely deal with a liquid waste containing dissolved complexes of iron and/or copper and other heavy metals with alkylenepolyacetic acid chelants is a question that must be faced after each cleaning job. It has been demonstrated that the liquid waste can be safely and efficiently incinerated, but with increasingly stringent controls on incineration, this is becoming less acceptable in many states. Thus, there exists a strong and increasing need for a safe and efficient method for removing heavy metals from such aqueous liquids prior to other treatment methods.

SUMMARY OF THE INVENTION

A novel process has now been discovered for removing iron from an aqueous liquid containing dissolved iron in the form of a soluble chelate(s) with an alkylenepolyamine polyacetic acid and/or soluble chelating salts of said acid. The process comprises the steps of: (a) adjusting the pH of said aqueous liquid to at least about 12.5, (b) adding sufficient quantities of a soluble calcium salt to facilitate the growth of insoluble colloidal iron hydroxide particles, and (c) separating the resulting insoluble mass containing iron hydroxide from the liquid effluent. The novel process is highly effective in reducing the amount of dissolved iron in solution and, in addition, the insoluble mass resulting from the process is easily separated from the liquid effluent.

Iron hydroxide is normally formed as a gelatinous mass which is difficult to deal with. In this process, however, the iron hydroxide is formed as a floc and is easily separable from the liquid.

DETAILED DESCRIPTION OF THE INVENTION

The general class of alkylenepolyamine polyacetic acid chelants is, of course, a well known class of compounds. This is shown by the Lesinski, Harriman, and Teumac patents which are incorporated herewith by reference. The types of metals that are chelated by these compounds are likewise well known and include, iron, chromium, copper, nickel, etc. The instant process is highly effective in removing dissolved iron from solutions of such chelant complexes.

Step (a) is a pH adjustment step in which the pH of the solution is adjusted to at least about 12.5. This is conveniently done by adding an alkali metal oxide or hydroxide to the aqueous liquid. Sodium hydroxide or potassium hydroxide would typically be used; and, sodium hydroxide would be the alkali metal hydroxide of choice based upon commerical availability and cost.

In step (b) a soluble calcium salt is added in amounts sufficient to facilitate the particle growth of the iron hydroxide floc. Usually, amounts of from about 0.25 to about 5 weight percent are satisfactory. Substantially any inorganic calcium salt can be used, but calcium chloride, calcium bromide, and calcium hydroxide are common calcium salts and they would typically be used. Calcium hydroxide is the calcium salt of choice because it is alkaline and the present process is conducted at a basic pH. An anionic water-soluble, high molecular weight polymer such as polyacrylamide and the like, can also be added to facilitate rapid flocculation; such addition is preferred. Usually the anionic polymer is added in the amounts of from about 2 to about 10 parts per million.

In step (c) the solid mass is separated from the liquid effluent. This can be an active process or a passive process. For example, one can use high pressure filtration techniques, centrifugation techniques, settling ponds, etc. The particular means used in step (c) will largely depend upon the equipment available to the artisan.

If one desires to also remove copper ions from the aqueous liquid, dimethyl- and/or diethyldithiocarbamate is added in essentially stoichiometric amounts, relative to the amount of dissolved copper. The reaction with the dialkyldithiocarbamate is almost instantaneous and the copper is removed in almost quantitative yield. The solid precipitate containing the copper is then removed from the liquid effluent by techniques as described for step (c).

If one desires to purify the effluent even further, the liquid effluent can be passed through a bed of activated charcoal to remove organics and to decolorize the liquid. The activated charcoal is also effective in removing trace amounts of heavy metals. After this "polishing" step, the liquid effluent contains the alkylenepolyamine polyacetic acid, usually as the primary ingredient dissolved in water. The alkylenepolyamine polyacetic acid can be removed from solution by lowering the pH. For example, ethylenediaminetetraacetic acid will precipitate at a pH of approximately 1.8 or below.

EXPERIMENTAL

The following experiments will further illustrate the invention.

Example 1

A representative "waste" solution was prepared using ammoniated EDTA buffered at a pH of about 9.2 with ammonia to dissolve iron sulfate (5100 ppm iron) and copper sulfate (1000 ppm copper). The pH of the solution was raised to about 12.5 using 50 percent aqueous sodium hydroxide, followed by the addition of two weight percent calcium hydroxide, followed by the addition of one weight percent sodium diethyldithiocarbamate. The precipitated solids were removed by filtration and the liquid effluent was tested for dissolved metals using conventional analytical techniques (e.g. atomic absorption). It was found that the clear liquid effluent contained less than one part per million dissolved iron and less than one part per million dissolved copper.

Example 2

A representative "waste" was prepared by dissolving iron sulfate (1500 pm iron) with an ammoniated EDTA buffered at a pH from of 4 to 6 with formic acid. This solution was then treated with 50 percent sodium hydroxide to a pH of about 12.5, followed by the addition of one weight percent calcium hydroxide. The solid precipitate was removed by filtration and the clear liquid effluent analyzed for dissolved metal content. It was found that the effluent contained less than one part per million dissolved iron.

Example 3

The waste from cleaning an industrial boiler at a utility company in California had been discharged to a holding pond. The commercial solvent used to clean the steam generating equipment was an inhibited ammoniated EDTA solution buffered with ammonia at a pH of approximately 9.2. The liquid waste contained chelated iron, chromium, copper, and nickel. Treatment of this waste to remove metals was a continuous treatment in which the liquid waste was pumped from the holding pond into a mixing tank at an average rate of about 35 gallons per minute. The treatment chemicals (50 percent aqueous sodium hydroxide, 35 weight percent calcium chloride, and 25 weight percent sodium diethyldithiocarbamate) were likewise continuously added to the mixing tank. The waste and the treatment chemicals were mixed in this 700 gallon mixing tank and allowed to react and overflow into the bottom of a 30,000 gallon clarifier. In the clarifier, the treated mixture was contacted with a polyacrylamide (AP 273 from The Dow Chemical Company) to enhance floc formation and settling rates. As the solids coagulated in the clarifier, the solids separated from the treated solution by gravity. The clarified solution rose to the top of the clarifier and overflowed to a polishing filter. The solids were withdrawn from the bottom of the clarifier slowly in order to maintain a stable sludge "blanket". The sludge blanket was quite dense (4–5 weight percent solids) and acted as a "sieve" to provide efficient solid/liquid separation.

The solids were transferred into a thickener unit (basically a holdng tank) where the solids continued to condense and precipitate. After the solids were accumulated, they were processed into filter cakes using a commerical filter press and diposed of safely.

The clear liquid effluent flowing from the clarifier was declorized in the polishing filter. Metal analysis (by atomic absorption spectroscopy) on the polished effluent provided the information in Table I.

TABLE I

| Metals | Before Treatment | After Treatment | % Removal |
|---|---|---|---|
| Iron | 1040 ppm | 0.09 ppm | 99.99 |
| Copper | 114 | 0.04 | 99.96 |
| Chromium | 0.73 | 0.13 | 82.2 |
| Nickel | 80 | 14 | 82.5 |

The total treatment chemicals used to treat 150,000 gallon of waste were: 1350 gallons of 50 weight percent sodium hydroxide, 4500 pounds of calcium hydroxide (dry weight basis), and 370 gallons of 25 weight percent sodium diethyldithiocarbamate.

What is claimed:

1. A process for removing iron and copper ions from an aqueous liquid containing dissolved iron and copper in the form of a soluble chelate with an alkylenepolyamine polyacetic acid and/or soluble chelating salts of said acid, said process comprising the steps of:
   (a) adjusting the pH of said aqueous liquid to a pH of at least about 12.5,
   (b) adding sufficient quantities of a soluble calcium salt to facilitate growth of insoluble colloidal iron hydroxide particles,
   (c) adding an alkali metal N,N-dimethyl - or N,N-diethyldithiocarbamate to the aqueous relative to copper dissolved in said aqueous fluid, and forming a solid precipitate containing said iron and copper, and (d) separating said precipitate from said aqueous liquid.

2. The process defined by claim 1 where said soluble calcium salt is calcium hydroxide.

3. The process defined by claim 2 wherein said calcium hydroxide is added in amounts of from about 0.25 to about 5 weight percent.

4. The process defined by claim 1 wherein said process is a continuous process in which iron is continuously removed from a flowing stream of said aqueous liquid.

5. The process defined by claim 1 wherein said aqueous liquid is an aqueous liquid waste produced by the cleaning of ferrous oxide-containing encrustations from ferrous metal surfaces with a solvent containing ammoniated EDTA at an alkaline pH; the pH being measured at 20° C.

6. The process defined by claim 1 comprising the additional step of adding a water soluble high molecular weight anionic polymer to facilitate flocculation of the insoluble colloidal iron hydroxide particles.

7. The process defined by claim 6 comprising the additional steps of: (e) contacting said liquid effluent with activate carbon, and (f) thereafter separating the liquid effluent from the activated carbon.

8. The process defined by claim 1 comprising the additional steps of: (e) contacting said liquid effluent with activated carbon, and (f) thereafter separating the liquid effluent from the activated carbon.

9. A waste treatment process for removing iron and copper ions from an aqueous liquid waste in which said ions exist as soluble chelates with ethylenediaminetetraacetic (EDTA) and/or a soluble chelating salt of EDTA, said process comprising the steps of:

(a) adjusting said aqueous liquid waste to a pH of at least about 12.5 with sodium hydroxide, (b) adding from about 0.25 to 1 weight percent of calcium hydroxide as an aqueous slurry, (c) adding a substantially stoichiometric amount of sodium N,N-diethyldithiocarbamate relative to the amount of copper ions present in said aqueous waste liquid, (d) adding from about 2 to about 10 ppM of an anionic water soluble polyacrylamide and forming a solid precipitate containing said iron and copper ions and (e) separating said precipitate from said aqueous liquid waste to produce a liquid effluent.

10. The process defined by claim 9 comprising the additional steps of: (f) contacting said liquid effluent with activated carbon, nd (g) separating the activated carbon from the liquid effluent to thereby remove organic contaminants from said liquid effluent.

11. A process for removing iron and copper ions from an aqueous liquid containing dissolved iron and copper in the form of a soluble chelate with an alkylenepolyamine acid and/or soluble chelating salts of said acid, said process comprising the steps of:

(a) adjusting said aqueous liquid to a pH of at least about 12.5, (b) adding sufficient quantities of a soluble calcium salt to facilitate growth of insoluble colloidal iron hydroxide particles, (c) adding an alkali metal N,N-diethyldithiocarbamate or an alkali metal N,N-dimethyldithiocarbamate to said liquid effluent in an amount substantially stoichiometric to dissolved copper in said liquid effluent to form a solid precipitate containing iron and copper ions, (d) separating said precipitate from said aqueous liquid to produce a liquid effluent, (e) contacting said liquid effluent with activated carbon, (f) separating said activated carbon from said liquid effluent, (g) adjusting said liquid effluent to a pH of less than about 1.8, and (h) separating alkylene polyamine polyacetic acid and/or chelating salts thereof precipitated by said pH adjustment from said liquid effluent.

12. The process set forth in claim 11, wherein said alkali metal dithio carbamate is sodium N,N-diethyldithiocarbamate or sodium N, N-dimethyldithiocarbamate.

13. The process defined by claim 11 where said soluble calcium salt is calcium hydroxide.

14. The process defined by claim 13 wherein said calcium hydroxide is added in amounts of from about 0.25 to about 5 weight percent.

15. The process defined by claim 11 wherein said process is a continuous process in which iron is continuously removed from a flowing stream of said aqueous liquid.

16. The process defined by claim 11 wherein said aqueous liquid is an aqueous liquid waste produced by the cleaning of ferrous oxide-containing encrustations from ferrous metal surfaces.

17. The process defined by claim 11 including adding a water soluble high molecular weight anionic polymer to facilitate flocculation of the insoluble colloidal iron hydroxide particles.

* * * * *